Feb. 14, 1961 E. R. KOPPEL 2,971,388
WIPER LINKAGE
Filed May 7, 1958 5 Sheets-Sheet 3

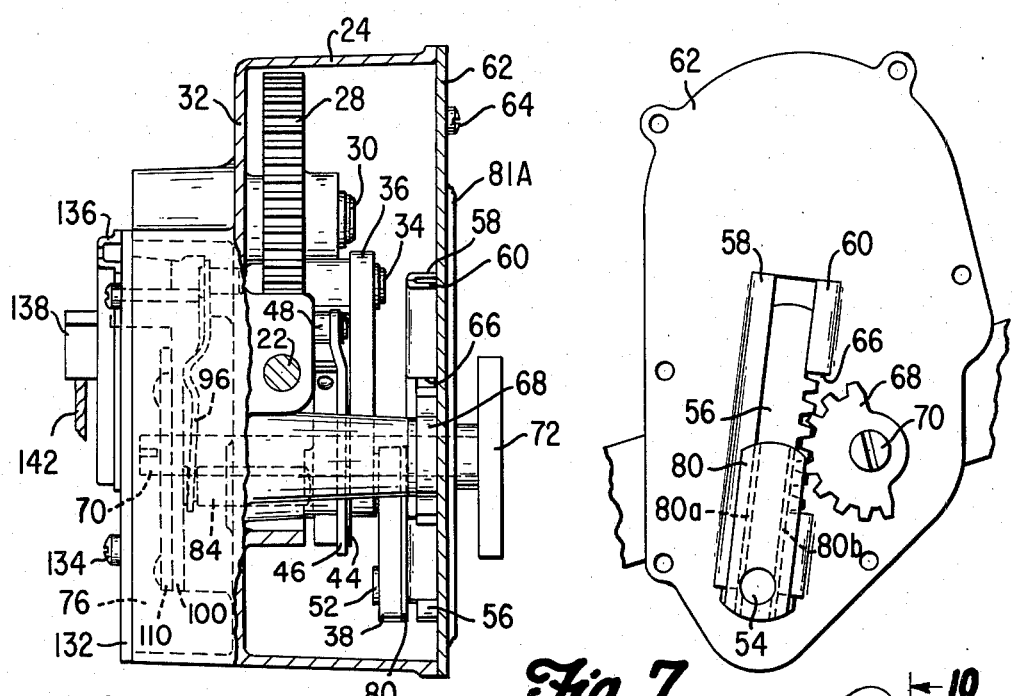
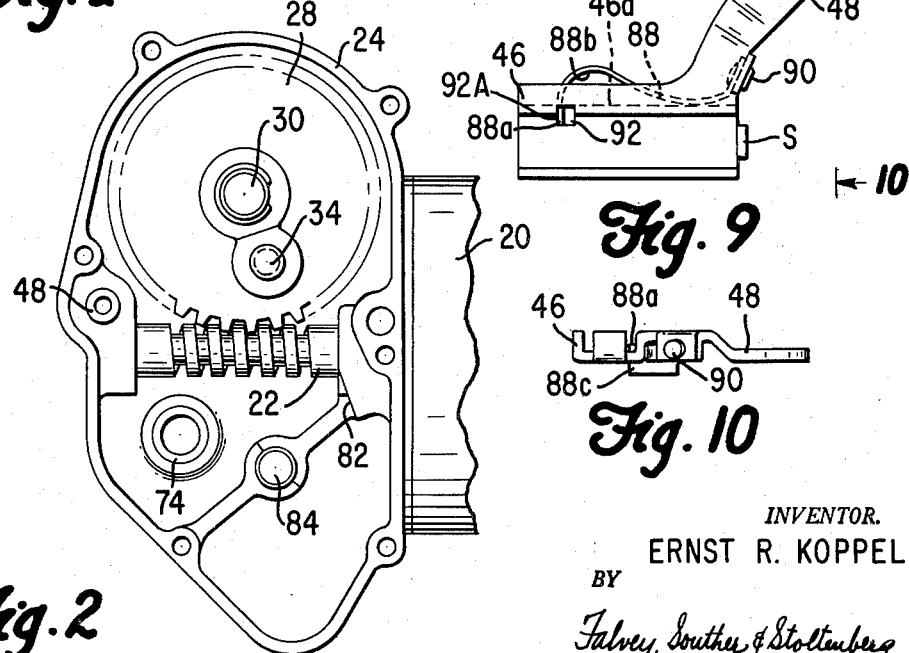

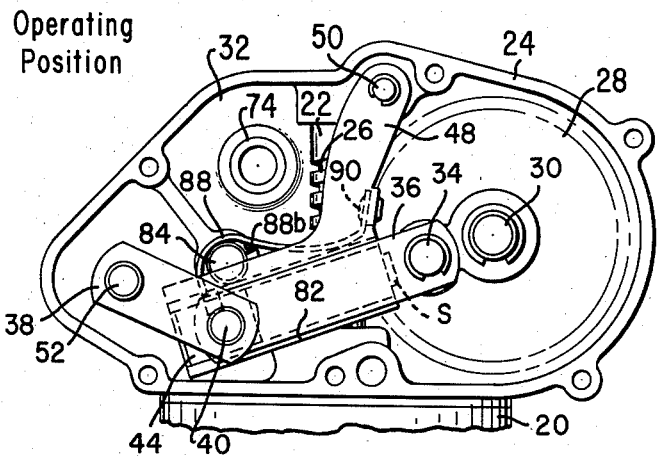
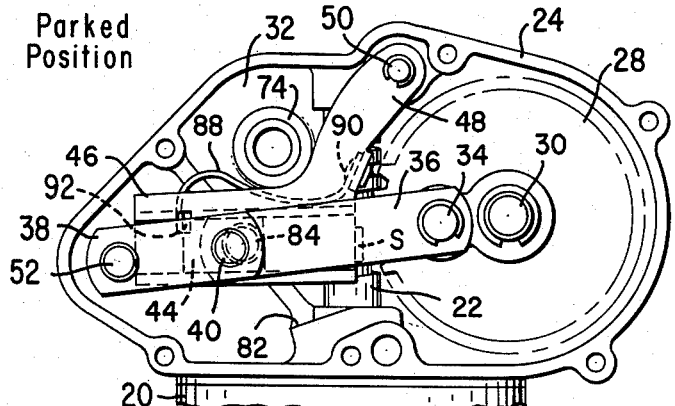
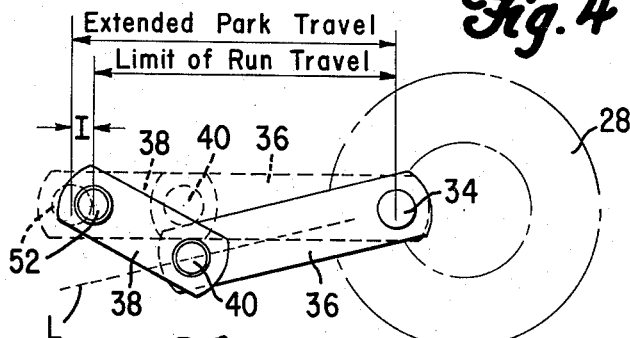
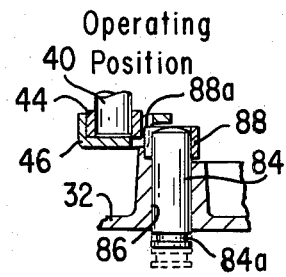
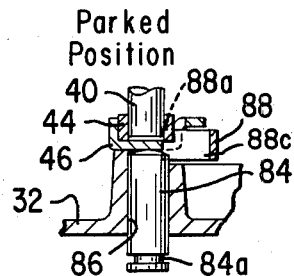
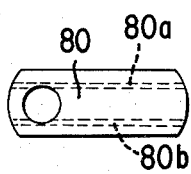

INVENTOR.
ERNST R. KOPPEL
BY
Falvey, Souther & Stottenberg
ATTORNEYS

Feb. 14, 1961  E. R. KOPPEL  2,971,388
WIPER LINKAGE

Filed May 7, 1958  5 Sheets-Sheet 4

INVENTOR.
ERNST R. KOPPEL
BY
ATTORNEYS

Feb. 14, 1961 E. R. KOPPEL 2,971,388
WIPER LINKAGE
Filed May 7, 1958 5 Sheets-Sheet 5

INVENTOR.
ERNST R. KOPPEL
BY
Fabrey, Souther & Stoltenberg
ATTORNEYS

United States Patent Office 2,971,388
Patented Feb. 14, 1961

2,971,388
WIPER LINKAGE

Ernst R. Koppel, Perrysburg, Ohio, assignor to The Electric Auto-Lite Company, Toledo, Ohio, a corporation of Ohio Filed May 7, 1958, Ser. No. 733,527
12 Claims. (Cl. 74—77)

This invention relates to an "off-glass" parking type of windshield wipers, particularly to an electric windshiled wiper using a unidirectional rotative motor which drives the wiper through a linkage wherein the parking position of the wipers is attained by changing the effective length of one of the links.

The present invention contemplates providing an electric windshield wiper which is driven by an electric motor which rotates only in one direction to drive a rack and a section gear actuating mechanism through a broken-knee linkage, the mechanism being so arranged that manual manipulation of a control means initiates a parking cycle at one end of its oscillatory stroke which provides a means to straighten out the broken knee linkage to increase the effective length of a portion of the linkage, so that the driving ratios thereof are changed at the outboard end of its stroke to shift the arc of sweep of the wiper blades in the parking direction to park the wiper blades parallel to and against the bottom edge of the windshield.

The present invention contemplates the provision of an electric windshield wiper which is reliable in operation and relatively inexpensive to produce in large quantities by mass production.

The invention further contemplates the provision of an electric windshield wiper driven by a unidirectionally rotating electric motor having a driving means giving the wiper blades a substantially simple harmonic motion over the windshield, so arranged that the driving means and its "off-glass" parking arrangements can be positioned in a relatively small housing to thereby reduce cost and efficiently utilize the space under the cowl of an automotive vehicle on which the windshield wiper is mounted.

It is, therefore, a principal object of this invention to provide an electric windshield wiper which is adapted to park the wiper blades in "off-glass" position by providing a controllable means to change the effective length of a link in the driving mechanism.

It is a further object of this invention to provide an electric windshield wiper utilizing a undirectionally rotating motor to drive the windshield wipers with a substantially simple harmonic motion which is capable of parking the wipers in an "off glass" position.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is in an elevational view, partly in section, showing the details of the mechanism in the driving compartment;

Fig. 2 is a plan view of the driving compartment with some of the driving elements removed;

Fig. 3 is a view similar to Fig. 2 with all of the driving elements in operating position;

Fig. 4 is a view similar to Fig. 2 with the operating parts in parked position;

Fig. 7 is a plan view of the bottom side of the cover for the driving compartment;

Fig. 9 is an elevational view of one of the components of the driving mechanism;

Fig. 10 is a side elevational view of the element shown in Fig. 9 taken along the line 10—10 of Fig. 9;

Fig. 11 is a cross-sectional view of a portion of the control mechanism in operating position;

Fig. 12 is a view similar to Fig. 11 except that the parts shown are in parked position;

Fig. 13 is a plan view of a spacer forming an element of the driving mechanism;

Fig. 14 is a schematic view of the driving linkage of the mechanism;

Figure 14A:
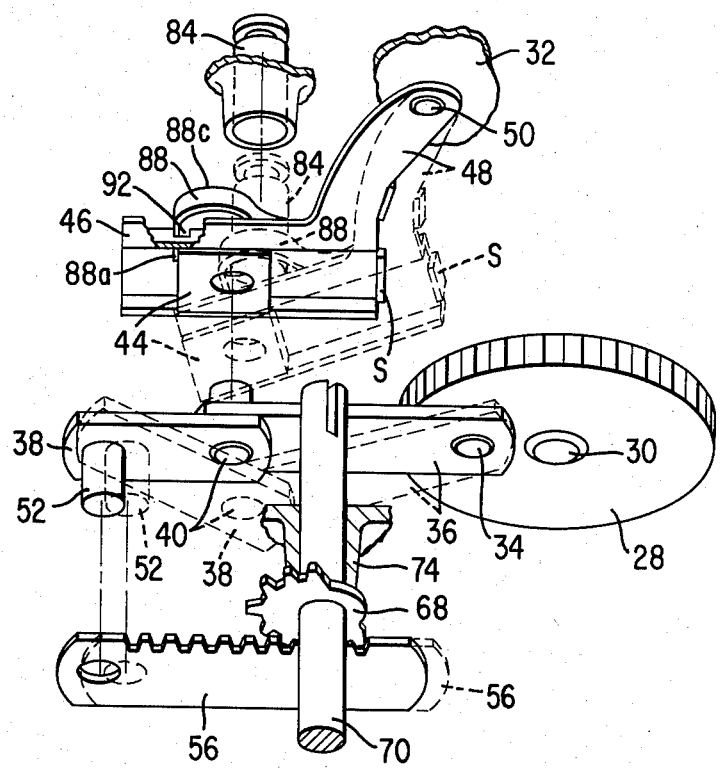
Fig. 14a is an exploded schematic view of the mechanism showing the operative relation between the parts.

Referring to the drawings, particularly to Figs. 1 and 2, an electric motor 20 is provided which drives a shaft 22, projecting in a casing 24, on the side of which the motor is suitably attached. The shaft 22 is fitted with an integral worm 26 which drives a worm gear 28 journaled on a stub shaft 30 cast into or press-fitted into a bore in the floor 32 of the casing. The worm gear (Fig. 5) is provided with an eccentric pin 34, on which is journaled a first driving link 36 which is connected rotatably to a second driving link 38 by a pin 40, press-fitted or welded into the end of the second driving link, and extending through the first link to rotatably cooperate with an aperture 42 in a slide 44, which is held in slideable relation in a movable guide 46 integrally mounted on a bell-crank 48 (Fig. 3) which is pivoted at its upper end on pin 50. The angular position of the bell-crank 48 and its guide 46 control the locus of movement of the slide 44, and, therefore, control the angle of the line of reciprocation of the pin 40, which thereby controls the angularity of the broken-knee driving relation between the first and second driving links 36 and 38. Referring to Fig. 14, this relation is shown diagrammatically with the dotted line L indicating the line of reciprocation of the pin 40 during normal driving relation. It will be noted that as the line of reciprocation of the pin 40 approaches a line drawn between the eccentric pin 34 and a driver pin 52 positioned in the distal end of the second driving link 38, the effective length of the driving linkage, consisting of the links 36 and 38, is increased by an increment I, which is utilized for the purpose of "off-glass" parking of the wiper blades as will appear hereinafter.

The driver pin 52 press-fitted, riveted or welded on the end of the second driving link is fitted in an aperture 54 (Fig. 7) in the end of a reciprocating rack 56, slideably fitted into a pair of cooperating guides 58 and 60, struck up on the back side of a cover plate 62, which is fitted onto the main casing 24 by screws 64 or the like. The guide 60 is cut away at one side to provide an opening 66 through which the rack 56 drives a gear sector 68 affixed to a driver shaft 70 extending beyond the cover plate 62 as shown in Fig. 1. The outer end of the shaft 70 is provided with a head 72 which is adapted to drive a linkage or the like (not shown) to actuate the pivot shafts to which the wiper arms are connected. The shaft 70 is suitably journaled in bearings fitted in bosses 74 integral with the floor 32 of the main casing 24, through which it extends to project into a switch casing 76 on the opposite side of the floor 32, where it performs a function to be described further hereinafter in connection with the control switch.

Referring to Figs. 5, 6, 8, and 13 it will be noted that a nylon spacer member 80 is provided to fit about the driver pin 52 between the link 38 and the rack 56, having a laterally-projecting portion extending parallel to the guides 58 and 60 between which is fitted a pair of depending flanges 80a and 80b to cause it to hold its position during reciprocation relative to the guides. A floor 81 is also provided between the guides by a plate 81A fitted on the outside of the cover plate 62 by welding or the like.

Figure 16:
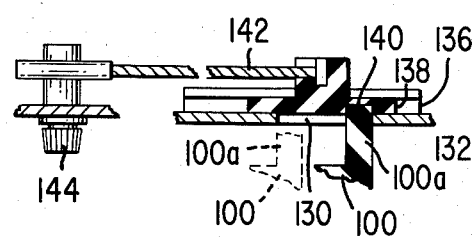
Fig. 16 is a sectional elevation showing the details of the manual control mechanism.
Figure 15:
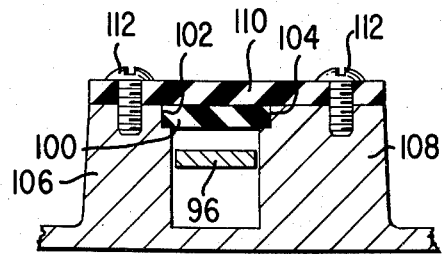
Fig. 15 is a cross-sectional view of a portion in the switching compartment taken along the line 15—15 of Fig. 6.

During normal operation of the mechanism, the link 36 is oscillated by rotation of the worm gear 28, to which it is attached by the eccentric pin 34. The oscillation of the link 36 reciprocates the pin 40, along the line L (Fig. 14) as guided by the slide 44 held in sliding relation by guide 46 which is held in locked relation against a stop 82 on the casing 24 (Figs. 4 and 3) by a transverse pintle 84, slideable in an aperture 86 in the floor 32 of the casing 24 (Figs. 3, 11, and 12), which engages the opposite side of the guide 46 as shown in Fig. 11. This determines the locus and slope of the line L and keeps the relation between the links 36 and 38 in a broken-knee driving relation as shown in Fig. 14. When the pintle 84 engages the side of the guide 46, as shown in Fig. 11, it also engages a latch member 88, which is formed as a curved resilient member attached at one end to the guide 46 by a rivet 90 (Fig. 9) while the opposite end 88a is positioned transversely of the side of the guide 46 where it engages a slot 92 formed in the side of the slide. In the bight 88b formed by the bent portion of the latch above the portion 88a, the pintle 84 is adapted to enter when the parts are in normal operating position, shown in Fig. 3, so that the end 88a is prevented from projecting into the path of slide 44 until the pintle 84 is withdrawn. When the pintle 84 is withdrawn (Fig. 11), the end 88a of the latch projects through slot 92 into the guide 46, abutting against face 92A and engages the forward end of slide 44 to thereby form a latch when the link 36 is being moved forwardly or to the left, as viewed in Fig. 3, to lock the slide 44 to the guide 46 and rotate the guide about its pivot 50 to the position shown in Fig. 4. Manual control means are provided to control the movements of the pintle 84 and also the switch means for the motor which are generally shown in Figs. 1, 15 and 16.

The pintle 84 extends into the switch chamber 76 (Fig. 5) and adjacent its end an annular recess 84a is provided, into which fits the bifurcated end of a leaf spring 96 normally biasing the pintle outwardly and out of engagement with the guide 46. The spring 96 is anchored at its opposite end by a rivet 96a press-fitted into an aperture in a boss 96b, and is provided, adjacent a central location, with a hump 96c which cooperates with a cam 98 formed on a sliding switch member 100, the cam 98 being adapted to apply a spring bias acting downwardly (Fig. 5) on the pintle 84 by riding up on the hump 96c. The member 100 is fitted in sliding relation in shallow recesses 102 and 104 formed adjacent the ends of a pair of bosses 106 and 108, between which the spring 96 is positioned as shown in Fig. 15. The switch member 100 is held in position in the recesses 102 and 104 by an insulating switch plate 110 affixed to the upper surfaces of the bosses 106 and 108 by screws 112 as seen in Fig. 15.

Figure 6:
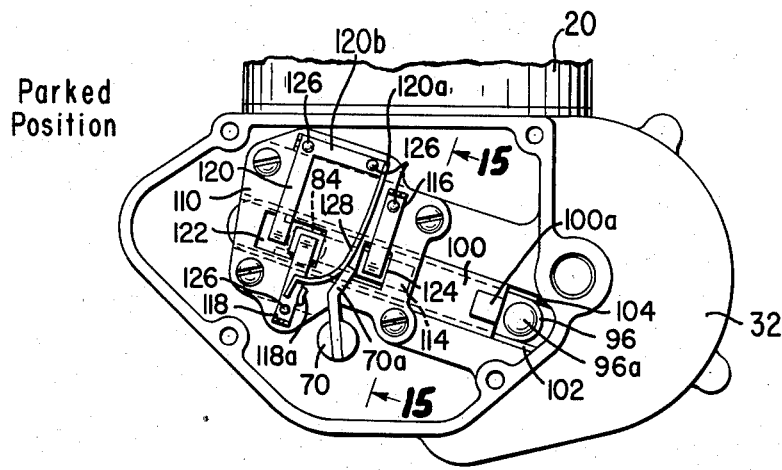
Fig. 6 is a plan view of the switching compartment taken along the line 6—6 of Fig. 5.
Figure 8:
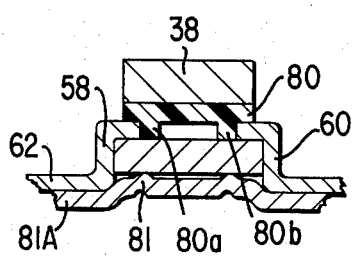
Fig. 8 is a sectional elevation of a detail taken along the line 8—8 of Fig. 5.
Figure 17:
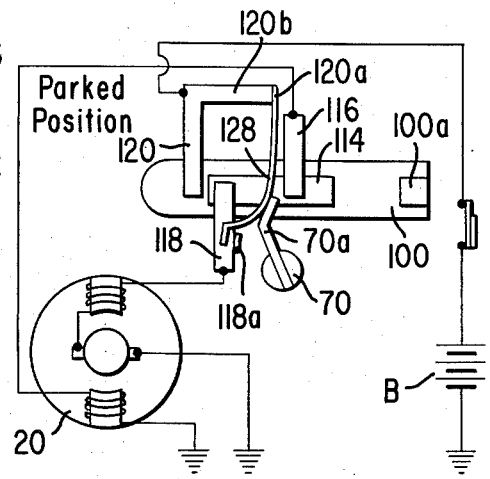
Fig. 17 is a schematic diagram of connections for the motor and the control switch.

Referring now to Figs. 6, 17 and 18 and 18A, the essential details of the control switch for the electric motor 20 are shown, whereby the motor can be connected in a circuit for high speed operation (Fig. 18), slow speed operation (Fig. 18A), and parking (Fig. 17). The sliding switch member 100, capable of being moved to its various operative positions, shown in these figures by a manual means, to be described hereinafter, is provided with an imbedded contact member 114, which, in its various positions, cooperates with fixed resilient contact members 116, 118 and 120 through apertures 122 and 124 in the insulating switch plate 110 as is best shown in Fig. 6. The contact members 116, 118, and 120 are attached to the insulating plate 110 by suitable rivets 126 and are connected in the motor circuit as shown schematically in Fig. 17. For parking, a separate switch is provided, which consists of a flexible blade 128 of arcuate conformation having one end affixed to an ear 120a on a lateral extension 120b on the contact member 120, and extending in spaced relation over the plate 110 to cooperate at its other end with a second ear 118a formed as an integral part of the contact member 118. The central arcuate portion of the parking switch blade 128 cooperates with a short arm 70a affixed to the end of the main driver shaft 70 which extends into the switch housing 76 as already described. During normal operation, the shaft 70 and its short arm 70a oscillate through an angle wherein the switch blade 128 is not disturbed but, when the shaft 70 moves beyond its normal arc of sweep to park the wiper blade, the short arm 70a will also move further to displace the blade 128 from its contactual relation with the ear 118a which opens the motor power circuit to stop the motor.

For manual control of the switch slide member 100, an integral projection 100a is provided which extends outwardly through an aperture 130 (Fig. 16) formed in a cover plate 132 for the switch housing 76, to which the plate 132 is attached in any convenient manner as by screws 134 (Fig. 1). On the exterior of the plate 132, a guide 136 is provided attached to the plate by spot-welding or the like, to house a sliding member 138, which has an aperture 140 in its lower surface to fit over the top of the projection 100a to form a driving relation between them. The axes of movement of the sliding member 138 and that of the member 100 are parallel. The sliding member 138 is controlled by a Bowden wire 142 which is controlled manually by a knob 144 located on the dashboard or any other suitable place convenient to the operator of the automotive vehicle.

The device operates as follows: Referring to Figs. 3 and 18a, which show the normal operating position of the oscillating mechanism and the control switch, the power from the battery B to the motor 20 causes it to rotate at its lowest operative speed. This rotates the worm 26 to revolve the worm gear 28, so that its eccentric pin 34 oscillates link 36, so that the pin 40 will reciprocate along the line L (Fig. 14) being guided by the slide 44 reciprocating in the guide member 46. The guide member 46 is held in its normal operating position against stop 82 (Figs. 3 and 4) by the pintle 84 which contacts the side 46a (Fig. 9) of the member 46 being positioned within the bight 88b of the resilient latch member 88 (Fig. 3). This prevents the tip portion 88a of the latch member from moving into latching position, which, therefore, will always remain in retracted (unlatched) position as long as the pintle 84 contacts the side 46a.

The reciprocation of the pin 40 along the line L will drive link 38, which then, by its pin 52, will drive the rack 56 (Figs. 7 and 8) by reciprocating it within the guides 58 and 60. The rack then oscillates the sector gear 68 and its shaft 70 through its normal arc of sweep which includes the oscillation of the small arm 70a in the switch compartment 76. This operational cycle will continue at both the high and slow speeds of operation of the motor 20, when the switch elements are in the positions shown in Figs. 18 and 18A.

If now the operator actuates the manual control knob 144 to thrust the member 100 to the right (Fig. 16) this will move the cam 98 (Fig. 5) to the right at the same time to displace it from its cooperative relation with the hump 96c in the resilient spring member 96 to allow it to place a bias on the pintle 84 to move it outwardly and, therefore, out of engagement with the guide member 46. By this movement, the slide member 100 moves to the position shown in Fig. 17 which shows the final parking relations of the switch members. The arm 70a, however, cannot open the contacts 128 and 118a until a change has taken place in the driving linkage including links 36 and 38.

Figure 5:
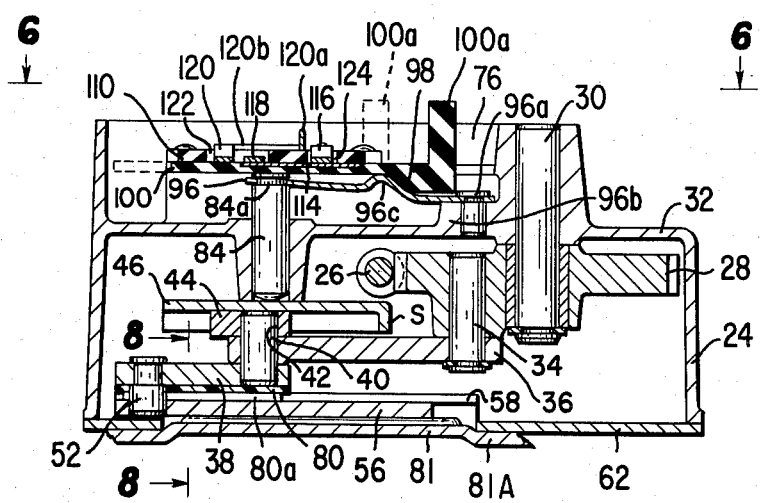
Fig. 5 is a cross-sectional view of the driving compartment and also the switching compartments with the cover of the latter removed.

Returning now to the pintle 84, which, by the change in the position of the slide member 100, is now being acted upon by the bias outwardly of the spring 96, when the pin 34 goes over center, the pressure conditions are favorable to allow the bias of the spring 96 to withdraw the pintle 84 outwardly to the position shown in Figs. 5 and 12. This frees the guide 46 and also the resilient member 88 from the restraint of the pintle 84, so that the guide may now move about its pivot point 50, and the tip 88a of the spring 88 may move down into the slot 92 in the side of the guide 46 (Fig. 9) where it interferes with the reciprocation of the slide 44 within the guide 46 during that phase of its reciprocation when it is moving to the left, as shown in Fig. 3. The parts are designed, so that the slide 44 contacts the tip 88a at a point short of its normal reciprocation whereby the slide 46 is latched to the slide 44 and will move forward with it in an arc determined by the permissive clockwise movement about the pivot point 50, so that the arm 48 of the guide 46 contacts the lower side of the boss 74 (Fig. 4). This raises the guide 46 and straightens out the "broken knee" arrangement which obtains during normal operation and increases the effective length of the linkage from pin 34 to pin 52 by an increment I (Fig. 14) which changes the sweep location of the shaft 70 to park the driven windshield wipers (not shown) in their "off glass" position substantially parallel to and in touching relation with the bottom edge of the windshield.

The change in the sweep location of the shaft 70 also changes the sweep location of the small arm 70a (Figs. 6 and 17), so that it will contact the arcuate portion of the switch blade 128 to displace it to the right and thereby open the contact relation between the blade 128 and the contact ear 118a, which opens the motor power circuit, as shown in Fig. 17, to stop the operation of the motor.

Figure 18:
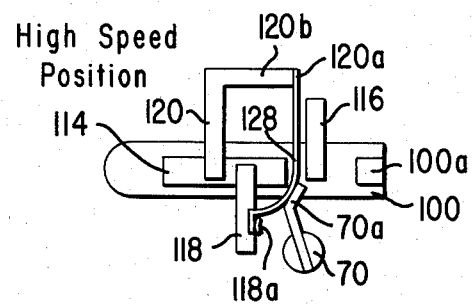
Figs. 18 and 18A are views showing the different positions of the control switch mounted in the switching compartment.
Figure 18A:
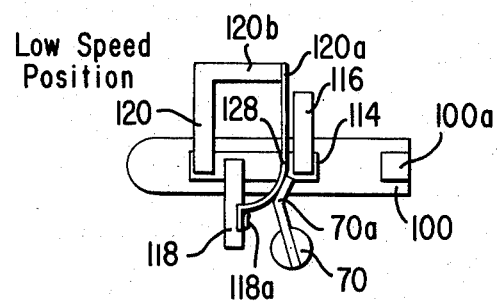

When the operator wishes to begin a new cycle of operation, he actuates the knob 144 to pull the slide member 100 to the left (Fig. 5) to a position shown either in Figs. 18 or 18A, depending upon the speed of operation he desires. This moves the cam 98 to the left up onto the hump 96c of the spring 96 and places an inward spring bias on the pintle 84. At this time, the pintle will hit the bottom of the guide 46, as shown in Fig. 12, and will not be able to move inwardly until the guide 46 has again been returned to its normal operating position shown in Fig. 3. This movement is obtained by the power movement of the slide 44 contacting stop S on the right end (Fig. 9) of the guide 46 which will pull the whole guide 46 with its arm 48 in a counter clockwise rotation about the pivot pin 50 until the stop 82 is encountered when the pin 34 of the worm gear 28 begins its downward movement (Fig. 3). During this movement, the pintle 84 contacts the projecting side 88c of the spring 88 (Fig. 10) and pulls the tip 88a back, so that it no longer projects into the path of slide 44. The bias of the spring 96 then causes the pintle to snap into locking relation again with the side 46a of the guide 46, the forces acting on these parts, allowing free movement, and the parts of the mechanism are again in normal operating relation in a "broken knee" position with an unobstructed path to the slide 44 wherein the sweep or arc of the shaft 70 and the small arm 70a are returned to normal.

The normal arc of sweep of the shaft 70 is determined by the eccentricity of the pin 34, which is not changed at any time, but the parking position is attained by changing the effective length of the linkage driving the shaft 70. This change occurs during the last oscillation of the shaft as it approaches the parked position, so that the wiper blades, which the shaft drives, do not change direction of their movement across the windshield at any time other than that occurring during their normal operation.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a device of the class described, a rotary driving member, a reciprocating driven member, a pair of links pivotally connected together at one end and their other ends being pivotally connected to the driving and driven members respectively to provide a broken knee driving connection between the driving and driven members, movable guide means cooperating with the pivotal connection between the pair of links to define the locus of movement of said pivotal connection whereby the angularity of the broken knee connection between the links is controlled, a latch cooperating with the guide means and the links to lock one link to the guide means to move the guide means in a direction to straighten the broken knee driving connection to increase the effective length of the driving connection between the driving and driven members, and manual means to control the latch to initiate the locking of the parts.

2. In a device of the class described, a rotary driving member, a reciprocating driven member, a broken knee driving connection comprising a pair of links pivotally connected together at one end and their other ends being pivotally connected to the driving and driven members respectively, movable guide means cooperating with the pivotal connection between the pair of links to define the locus of movement of said pivotal connection whereby the angularity of the broken knee connection between the links is controlled, a latch on the guide means to selectively lock the links to the guide when in a predetermined operative relation, means to move the guide means in a direction to straighten the broken knee driving connection to increase the effective length of the driving connection between the driving and driven members, and manual means to control the latch to initiate the locking and unlocking of the parts, said latch being released from the links on the return stroke of the parts.

3. In a device of the class described, a rotary driving member, a reciprocating driven member, a pair of links connected together at one end by a pivotal connection including a slide means and their other ends are pivotally connected to the driving and driven members respectively to provide a broken knee driving connection between the driving and driven members, movable guide means for the slide means of the pivotal connection between the pair of links to define the locus of movement of said pivotal connection whereby the angularity of the broken knee connection between the links is capable of being controlled, a latch on the guide means to lock the link cooperating with the driving means to the guide means to move the guide means in a direction to straighten the broken knee driving connection to increase the effective length of the driving connection between the driving and driven members, and manual means to control the latch to initiate the locking of the parts.

4. In a device of the class described, a rotary driving member, a reciprocating driven member, a broken knee driving connection between the driving and driven members comprising a pair of links pivotally connected together at one end and at their other ends being pivotally connected to the driving and driven members respectively, a slide means for the pivotal connection between the pair of links, movable guide means for the slide means to define a straight line movement of the pivotal connection whereby the angularity of the broken knee connection is controlled, a latch on the guide means adapted to selectively lock the links to the guide means when the parts are in a predetermined operative relation to enable the driving member to move the guide means in a direction to straighten the broken knee driving connection to increase the effective length of the driving connection comprising the links between the driving and driven members, and manual means to control the latch to initiate locking and unlocking of the links to the guide means, said latch being selectively released from its locking relation between the links and the guide means on the return stroke of the parts.

5. In a device of the class described, a rotary driving member, a reciprocating driven member, a broken knee driving connection between the driving and driven members comprising a pair of links pivotally connected together at one end and at their other ends being pivotally connected to the driving and driven members respectively, a slide means for the pivotal connection between the pair of links, movable guide means for the slide means to define a straight line movement of the pivotal connection whereby the angularity of the broken knee connection is controlled, a spring latch on the guide means adapted to selectively lock the links to the guide means when the parts are in a predetermined operative relation to enable the driving member to move the guide means in a direction to straighten the broken knee driving connection to increase the effective length of the driving connection comprising the links between the driving and driven members, and manual means to control the latch to initiate locking of the links to the guide means, said latch being released from its locking relation between the links and the guide means on the return stroke of the parts unless overcontrolled by the manual means.

6. In a device of the class described, a rotary driving member, a reciprocating driven member, a broken knee driving connection between the driving and driven members comprising a pair of links pivotally connected together at one end and at their other ends being pivotally connected to the driving and driven members respectively, a slide means for the pivotal connection between the pair of links, movable guide means for the slide means to define a straight line of movement for the pivotal connection whereby the angularity of the broken knee connection is controlled, a manual control mechanism, and a spring latch on the guide means controlled by the manual control mechanism adapted to selectively lock the links to the guide means when the parts are in a predetermined operative relation to enable the driving member to move the guide means in a direction to straighten the broken knee driving connection to increase the effective length of the driving connection comprising the links between the driving and driven members, said latch being selectively released to disengage the locking relation between the links and the guide means on the return stroke of the parts.

7. In a self-energized off-glass parking windshield wiper having a rotating driving element and a reciprocating driven element, a broken knee connecting member consisting of two pivotally interconnected links operative to form a driving connection between the driving and the driven elements, means movable by the driving element to control the locus of movement of the pivotal connection between the links, and latch means including a manual control to lock the pivotal connection to said means to change the locus of movement to increase the effective length of the driving connection to provide off-glass parking for the windshield wiper.

8. In a self-energized off-glass parking windshield wiper having a rotating driving element and a reciprocating driven element, a broken knee connecting member consisting of two pivotally interconnected links operative to form a driving connection between the driving and the driven elements, pivoted means to control the locus of movement of the pivotal connection between the links, and latch means including a manual control to lock the pivotal connection relative to the pivoted means to vary the locus of movement of the pivoted connection to increase the effective length of the driving connection to provide off-glass parking for the windshield wiper.

9. In a self-energized off-glass parking windshield wiper having a rotating driving element and a reciprocating driven element, a broken knee connecting member consisting of two pivotally interconnected links operative to form a driving connection between the driving and the driven elements, means movable by the driving element to control the locus of movement of the pivotal connection between the links, latch means to lock the control means for the pivotal connection to the pivotal connection to change the locus of movement of the pivotal connection to increase the effective length of the driving connection to provide off-glass parking for the windshield wiper, and manual means to control the latch means.

10. In a self-energized off-glass parking windshield wiper having a rotating driving element and a reciprocating driven element, a broken knee connecting member consisting of two pivotally interconnected links operative to form a driving connection between the driving and the driven elements, means movable at selected times to control the locus of movement of the pivotal connection between the links, latch means to lock the pivotal connection to said control means to move said control means by the driving element to change the locus of movement of the pivotal connection to increase the effective length of the driving connection to provide off-glass parking for the windshield wiper, manually controlled means to lock and unlock the latch means, and stop means on said control means to engage a portion of the linkage to again move the control means to normal position to return the pivotal connection to its initial locus of movement for normal operation.

11. In a self-energized off-glass parking windshield wiper having a rotating driving element and a reciprocating driven element, a broken knee connecting member consisting of two pivotally interconnected links operative to form a driving connection between the driving and the driven elements, selectively movable means to control the locus of movement of the pivotal connection between the links, latch means to lock the pivotal connection to said movable means to change the locus of movement of the pivotal connection to increase the effective length of the driving connection to provide off-glass parking, manual means to lock and unlock the latch means and automatic means including a stop to return the pivotal connection to its initial locus of movement by moving the movable means for normal operation, said latch automatically locking the movable means to control the locus of movement of the pivotal connection between the links in position for normal operation.

12. In a self-energized off-glass parking windshield wiper having a rotating driving element and a reciprocating driven element, a broken knee connection consisting of two pivotally connected links operative to form a driving connection between the driving and driven elements, movable means to control the locus of movement of the pivotal connection between the links, latch means for the movable means to lock the movable means in a normal operating position and in a second position which changes the locus of movement of the pivotal connection to increase the effective length of the driven connection to provide off-glass parking for the windshield wiper, automatic means including a stop to return the movable means to control the locus of movement from one position to the other where it is locked by the latch means, and manual means to control the latch means.

References Cited in the file of this patent

UNITED STATES PATENTS

| | | |
|---|---|---|
| 2,395,789 | Oakley | Feb. 26, 1946 |
| 2,764,064 | Dyer | Oct. 2, 1956 |
| 2,765,064 | Dyer | Oct. 2, 1956 |

FOREIGN PATENTS

| | | |
|---|---|---|
| 523,671 | Great Britain | July 19, 1940 |
| 1,100,195 | France | Sept. 16, 1955 |